US006954571B2

(12) United States Patent
Ito

(10) Patent No.: US 6,954,571 B2
(45) Date of Patent: Oct. 11, 2005

(54) FIBER CONNECTING METHOD, LASER APPARATUS AND PROJECTION TELEVISION

(75) Inventor: Ken Ito, Yamoto (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 105 days.

(21) Appl. No.: 10/607,533

(22) Filed: Jun. 27, 2003

(65) Prior Publication Data

US 2004/0264864 A1 Dec. 30, 2004

(30) Foreign Application Priority Data

Jun. 28, 2002 (JP) ....................................... 2002-189945

(51) Int. Cl.[7] ................................................ G02B 6/04
(52) U.S. Cl. ....................................... 385/115; 385/116
(58) Field of Search ................................ 385/115, 116, 385/120, 121, 27, 28, 45

(56) References Cited

U.S. PATENT DOCUMENTS 3,825,336 A * 7/1974 Reynolds ....................... 355/1
6,434,302 B1 * 8/2002 Fidric et al. .................. 385/43

FOREIGN PATENT DOCUMENTS

| | | | |
|---|---|---|---|
| JP | 63-037767 | A | 2/1988 |
| JP | 04-033204 | A | 2/1992 |
| JP | 2000-304982 | A | 11/2000 |
| JP | 2001-15839 | | 1/2001 |
| JP | 2001-015839 | A | 1/2001 |
| JP | 2001-291922 | A | 10/2001 |
| JP | 2002-072007 | A | 3/2002 |

OTHER PUBLICATIONS

Japanese Office Action dated Apr. 6, 2005 for Appln. No. 2002–189945.

* cited by examiner

*Primary Examiner*—Juliana Kang
(74) *Attorney, Agent, or Firm*—Pillsbury Winthrop Shaw Pittman, LLP

(57) ABSTRACT

A fiber connecting method and a laser apparatus using the fiber connecting method are disclosed. A plurality of fibers are bundled into a fiber bundle. The ends of the plurality of the fibers are connected to an end of a single-core fiber having a larger core diameter than the plurality of the fibers. The plurality of the fibers have different directions and characteristics depending on the position connected to the single-core fiber.

24 Claims, 4 Drawing Sheets

A D G 12 11 14 13

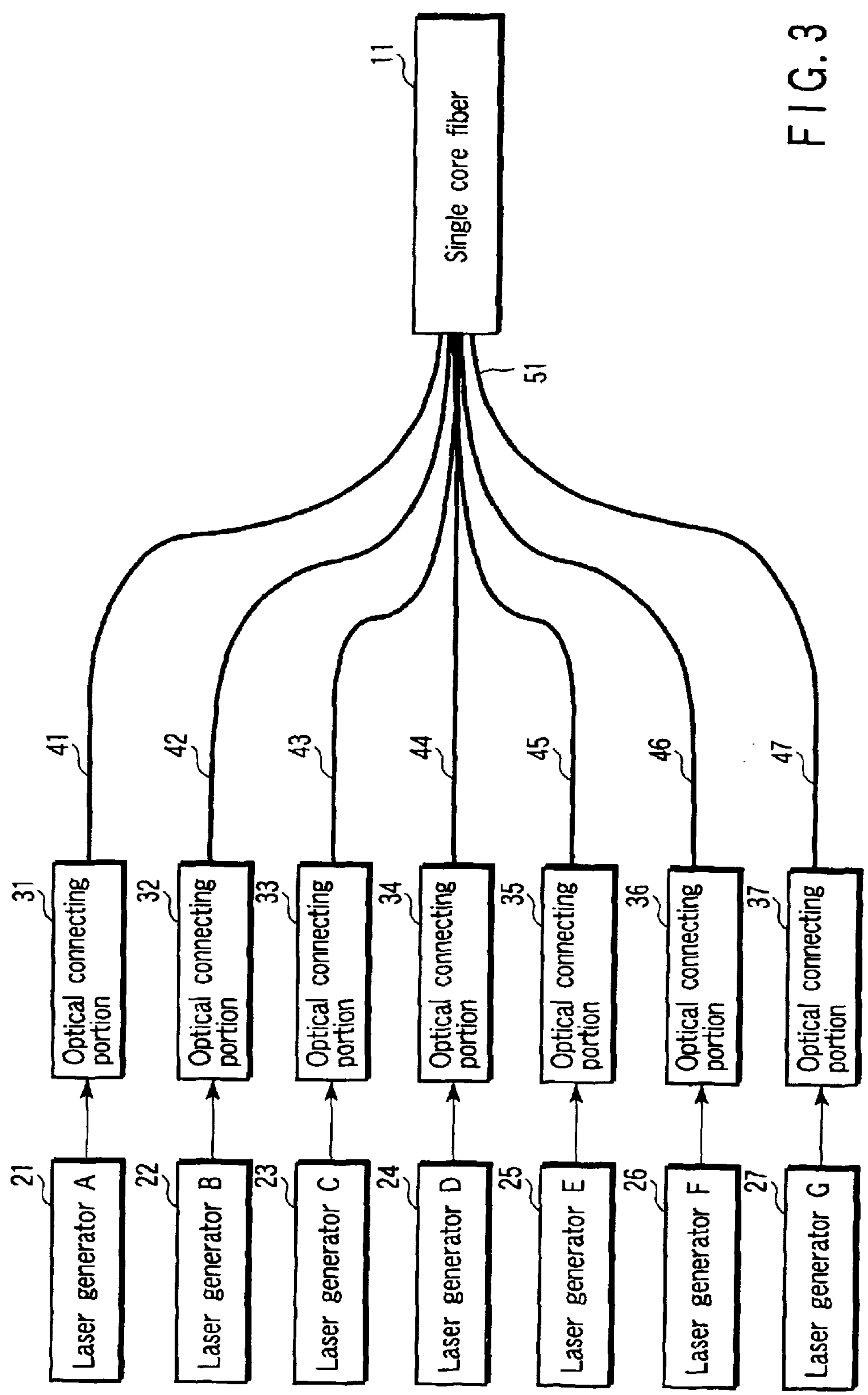
F I G. 3

FIBER CONNECTING METHOD, LASER APPARATUS AND PROJECTION TELEVISION

CROSS-REFERENCE TO RELATED APPLICATIONS

This application is based upon and claims the benefit of priority from the prior Japanese Patent Application No. 2002-189945, filed Jun. 28, 2002, the entire contents of which are incorporated herein by reference.

BACKGROUND OF THE INVENTION

1. Field of the Invention

The present invention relates to a fiber connecting method for combining a plurality of laser beams by bundling a plurality of fibers and connecting them to a single-core fiber, and a laser apparatus and a projection television using the method.

2. Description of the Related Art

The conventional method of connection employed in the field of a pumping semiconductor laser of a solid laser using an optical fiber bundle will be explained. In Jpn. Pat. Appln. KOKAI Publication No. 2001-15839, an "optical fiber pumping solid laser apparatus" is disclosed, in which a laser beam generator having a high pumping efficiency is obtained by connecting an optical fiber bundle with a plurality of fiber output semiconductor lasers and a single-core optical fiber to each other. The advantages described in this publication are that a high connecting efficiency can be achieved by combining the size of the outer periphery of the core of the fiber bundle and the core diameter of the single-core fiber and that the use of a single-core can suppress the irregularities of the laser beams emitted from the cores of the fiber bundle.

This prior art is based on a prerequisite that the laser beams from the fiber bundle have the same characteristics, and therefore intended to mix a plurality of laser beams to some degree and thereby obtaining a uniform output as a whole.

When the laser beams from the fiber bundle have different characteristics or, for example, have different wavelengths, however, the laser beams from the fibers are required to mix with each other uniformly.

Normally, a laser beam is propagated through a fiber in any of predetermined several mode patterns unique to each fiber. The laser beam entering a fiber propagates through the fiber by being connected with a mode pattern capable of propagation. Frequently, however, the laser beam propagates in a mode pattern first connected. Therefore, the difference of the incidence point is directly reflected in the difference of the connecting mode pattern. This poses the problem that the exit pattern from the single-core fiber is varied from one wavelength to another depending on the point of incidence. The problem is especially serious in an application of a display for obtaining white light.

Specifically, when a fiber bundle and a single-core fiber are connected with each other, the exit pattern from the single-core fiber is varied with the position of each fiber in the fiber bundle. Thus irregularities are caused, thereby posing the problem that it is impossible to obtain an exit light having a uniform mixture of laser beams.

BRIEF SUMMARY OF THE INVENTION

According to an aspect of the invention, there is provided a method of connecting fibers, comprises combining a plurality of fibers into a fiber bundle; and connecting each one end of the plurality of fibers to an end of a single-core fiber having a larger core diameter than the fibers, the fibers having different directions and characteristics at different positions connected with the single-core fiber.

BRIEF DESCRIPTION OF THE SEVERAL VIEWS OF THE DRAWING

FIG. 3 is a block diagram showing a laser apparatus using a fiber connecting method according to an embodiment of the invention.

DETAILED DESCRIPTION OF THE INVENTION

A fiber connecting method and a laser apparatus using the fiber connecting method according to an embodiment of the invention will be explained in detail below with reference the accompanying drawings.

[First Embodiment]

Figure 1:
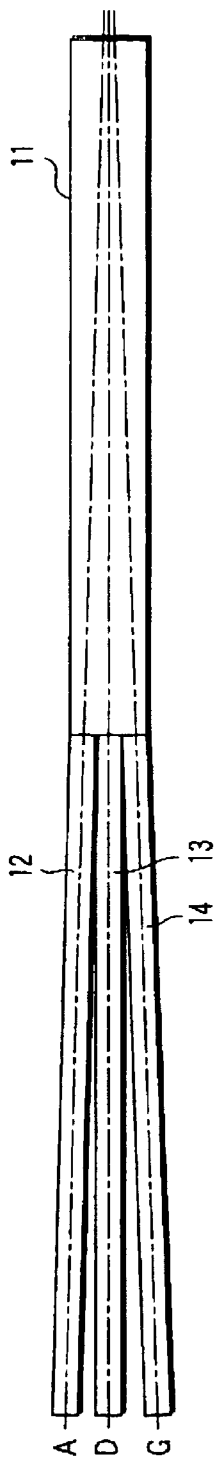
FIG. 1 is a sectional view showing inclined fibers bundled and a single-core fiber according to a first embodiment of the invention.
Figure 5:
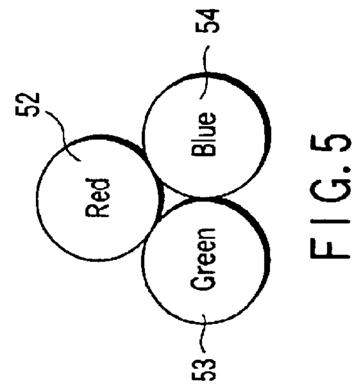
FIG. 5 is a sectional view showing an example of fibers bundled according to an embodiment of the invention.

According to a first embodiment, there are provided a fiber connecting method in which a plurality of fibers forming a fiber bundle have different directions depending on the position connected to a single-core fiber, and a laser apparatus using the same method. FIG. 1 is a sectional view showing a fiber bundle having inclined fibers and a single-core fiber according to a first embodiment of the invention, FIG. 2 a sectional view showing a fiber bundle having fibers with inclined cut surfaces and a single-core fiber according to a first embodiment of the invention, FIG. 3 is a block diagram showing a laser apparatus using the fiber connecting method, FIG. 4 is a sectional view showing an example of fibers bundled, and FIG. 5 is a sectional view showing an example of fibers bundled.

With reference to these drawings, a laser apparatus using the fiber connecting method according to an embodiment of the invention will be explained. As shown in FIG. 3, a laser beam from a laser generator A21 enters an optical fiber 41 through a light coupler 31. Similarly, the laser beams from laser generators B22 to G27 enter optical fibers 42 to 47 through light couplers 32 to 37, respectively. The seven fibers 41 to 37 are bundled as a fiber bundle 51 and connected to a single-core fiber 11, as shown in FIG. 4.

The laser beams from the laser generators 21 to 27 have not the same wavelength but generate two or more different wavelengths. In the process, the optical fiber 44 entered by the laser beam from the laser generator D is arranged at the central position D while the other fibers 41 to 43, 45 to 47 are arranged at the outer peripheral portions A to C, E to G, respectively, in FIG. 4. When these optical fibers would directly enter the single-core fiber 11 without being subjected to any processing, the laser beams having different wavelengths would not sufficiently be mixed and constitute an irregular exit light.

Figure 4:
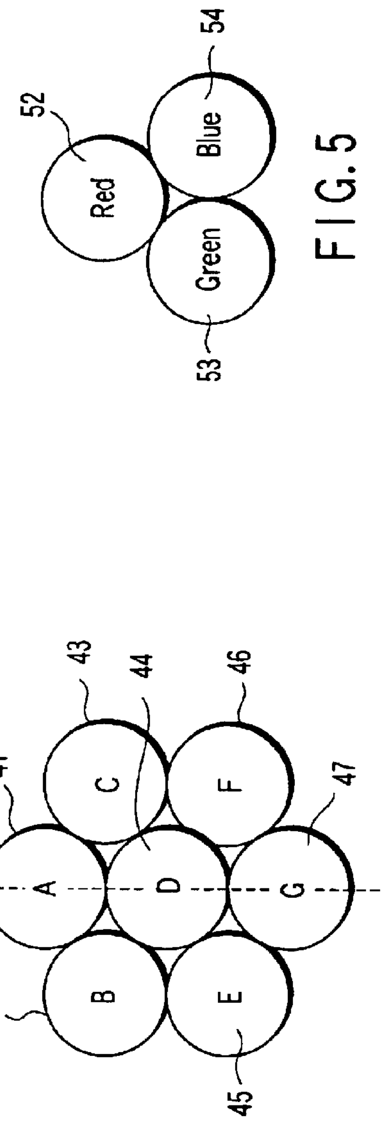
FIG. 4 is a sectional view showing an example of fibers bundled according to an embodiment of the invention.

Consequently, with a fiber connecting method according to an embodiment of the invention, as shown in FIG. 1 showing a part cut along the dashed line in FIG. 4, the fibers are bundled in such a manner that the optical axes of the exit beams of the optical fibers are directed to cross each other at a point, with the optical fibers arranged at the outer peripheral portion directed toward the center of the single-core fiber 11. As a result, the output beams from the fibers of the fiber bundle cross each other and are easily converted into a common connecting mode when entering the single-core fiber. Thus, the output laser beams from the laser generators A21 to G27 are easily mixed in the single-core fiber 11, so that the exit beams from the fibers 41 to 47 become uniform as the laser beams from the laser generators are sufficiently mixed with each other.

The laser generators of the laser apparatus emit a red laser beam, a green laser beam and a blue laser beam, each in monochromatic form, which are combined to obtain a white laser beam frequently. The laser generators A21 to G27 shown in FIG. 3 obtain monochromatic lasers of red, green and blue, respectively. Preferably, however, also when the three fibers 52 to 54 carry red, green and blue lasers, respectively, the white laser light with the laser beams combined can be obtained as shown in FIG. 5.

Figure 2:
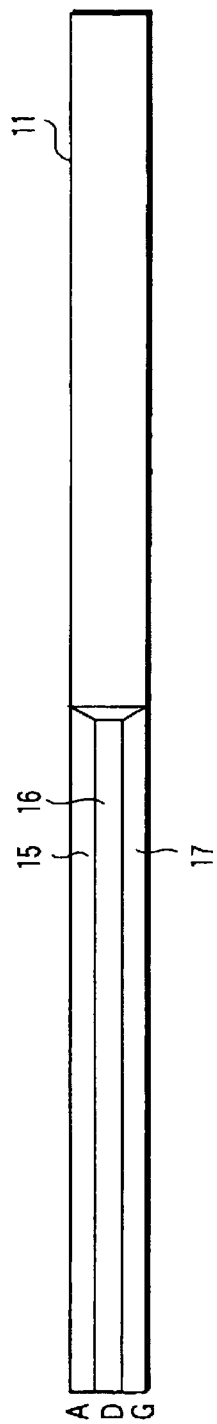
FIG. 2 is a sectional view showing fiber bundled and having an inclined cut surface and a single-core fiber according to an embodiment of the invention.

By setting the cut surface of the connecting portion of each fiber at an angle (for example, several degrees) as shown in FIG. 2, the same operation and effects as if the direction of each fiber is changed can be achieved. Specifically, as shown in FIG. 2, an inner fiber 16 has a cut section perpendicular to the fiber direction, while outer fibers 15, 17 have a cut surface not perpendicular but at an angle to the fiber direction. For this reason, the laser beams are radiated toward the center axis of the single-core fiber 11 in accordance with each angle, thereby making it possible to obtain a uniform exit light beam with the laser beams sufficiently mixed with each other.

As described above, according to the first embodiment of the invention, a plurality of fibers forming a fiber bundle are arranged in different directions in accordance with the positions thereof connected with the single-core fiber. Thus, a fiber connecting method and a laser apparatus using the method are provided in which an exit light beam free of irregularities can be obtained even when laser beams of different wavelengths are radiated.

[Second Embodiment]

Figure 6:
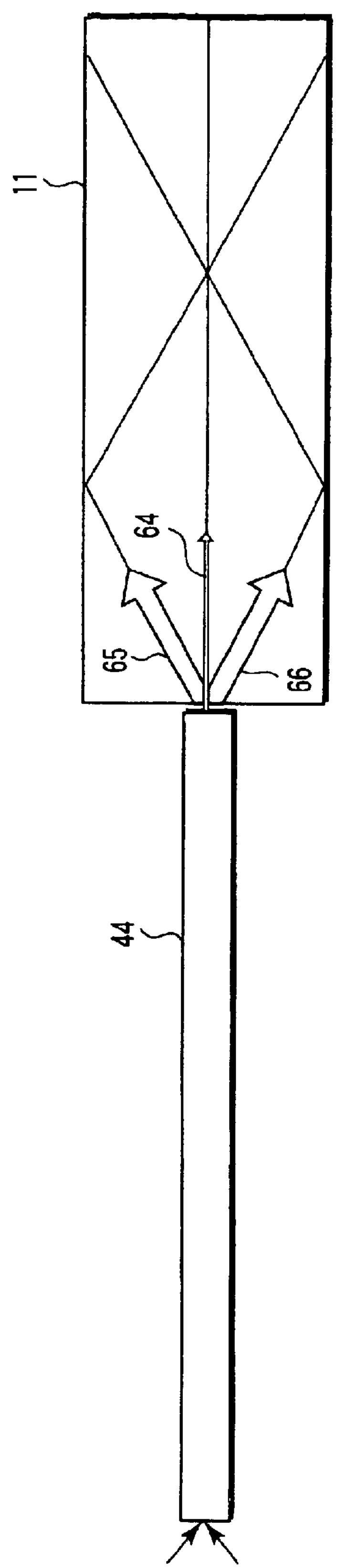
FIG. 6 is a diagram for explaining the operation of a fiber according to a second embodiment of the invention.
Figure 7:
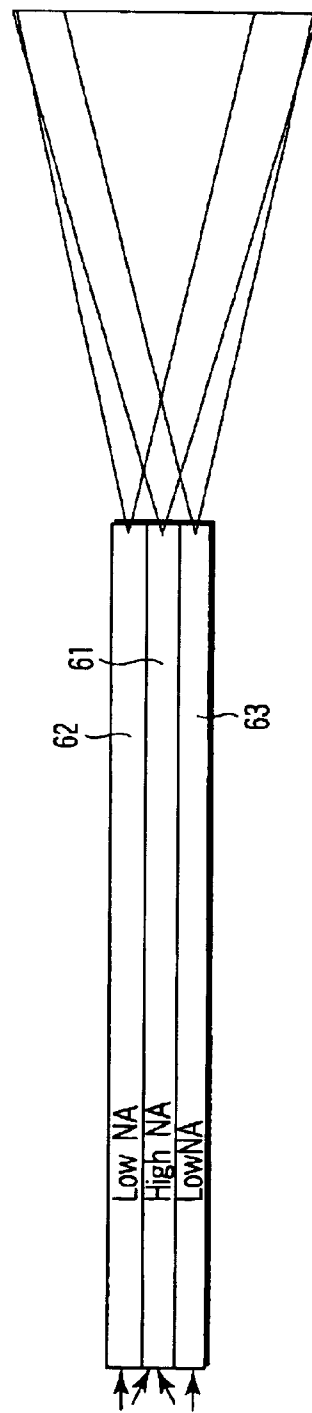
FIG. 7 is a sectional view showing an example of fibers according to the second embodiment of the invention.

According to a second embodiment, there is provided a fiber connecting method and a laser apparatus using the method, in which a plurality of fibers forming a fiber bundle have different characteristics in accordance with the position of connecting with the single-core fiber. FIG. 6 is a diagram for explaining the operation of a fiber according to a second embodiment of the invention, and FIG. 7 is a sectional view showing an example of a fiber according to a second embodiment of the invention.

In the second embodiment, unlike in the first embodiment, a fiber connecting method is provided in which the fibers are not set at an angle but a uniform exit light beam can be obtained in accordance with the characteristics of each fiber and each laser beam. Specifically, in FIG. 6, consider incident light beams and exit light beams 64, 65, 66 of an optical fiber 44 assuming the center of the fibers. Assume that the incident light beams are such that the exit beams 65, 66 of high-order mode represent a main portion of the exit light while the exit light beam 64 of low-order mode represents a small proportion. The low-order mode is defined as a mode in which the incident light is radiated in straight and the high-order mode as a mode of the light diffused and reflected in different directions. In order to obtain an exit light beam of high-order mode, the light that has entered the light coupler 34 shown in FIG. 3 is required to have an angle to the direction of the incident light beam. For obtaining an exit light beam of low-order mode, on the other hand, the light beams incident to the light couplers 31 to 37 are required to have no angle.

As described above, as shown in FIG. 7, in accordance with the fiber position, the light beams enter the outer optical fibers 62, 63, etc. (corresponding to the fibers 41, 47 shown in FIG. 3) from the light couplers 31 to 37 without any angle of incidence to assure the low-order mode. With the inner optical fiber 61 (corresponding to the fiber 44 in FIG. 3), on the other hand, the direction of the incident light beams from the light coupler 34 are set at an angle to assure the high-order mode.

As a result, the light coupler 34 is connected with the laser generator D24 to operate mainly in such a manner as to assure the high-order mode of the exit light beams from the optical fiber 44. In this case, as shown in FIG. 6, the laser beams 65, 66 enter the single-core fiber 11 in the directions at a larger angle of incidence than the beam 64. The beams 65, 66 thus are more easily connected with the high-order mode of the single-core fiber 11 and thus more easily mixed with the exit beams from the other fibers placed outside, thereby obtaining a uniform exit light beam.

An exit beam more easily connected with the high-order mode can be alternatively obtained by increasing the numerical aperture (NA) of the inner optical fiber 44 as compared with that of the outside optical fibers of the bundle, as shown in FIG. 7, as another method. The numerical aperture of a fiber is determined by the refractive indexes of the materials of a core and a cladding thereof, and it is preferable to employ a fiber having a high NA of 0.35 and a low NA of 0.30, for example.

The aforementioned two methods may be employed at the same time, or more effectively implemented with the features of the first embodiment.

As described above, according to the second embodiment, a fiber bundle is composed of a plurality of optical fibers entered by laser beams generated from a plurality of laser generators. When the fiber bundle is connected with a single-core fiber, the exit light beams from the single-core fiber can uniformly mix with each other without being affected by the position of each fiber forming the fiber bundle.

[Third Embodiment]

Figure 8:
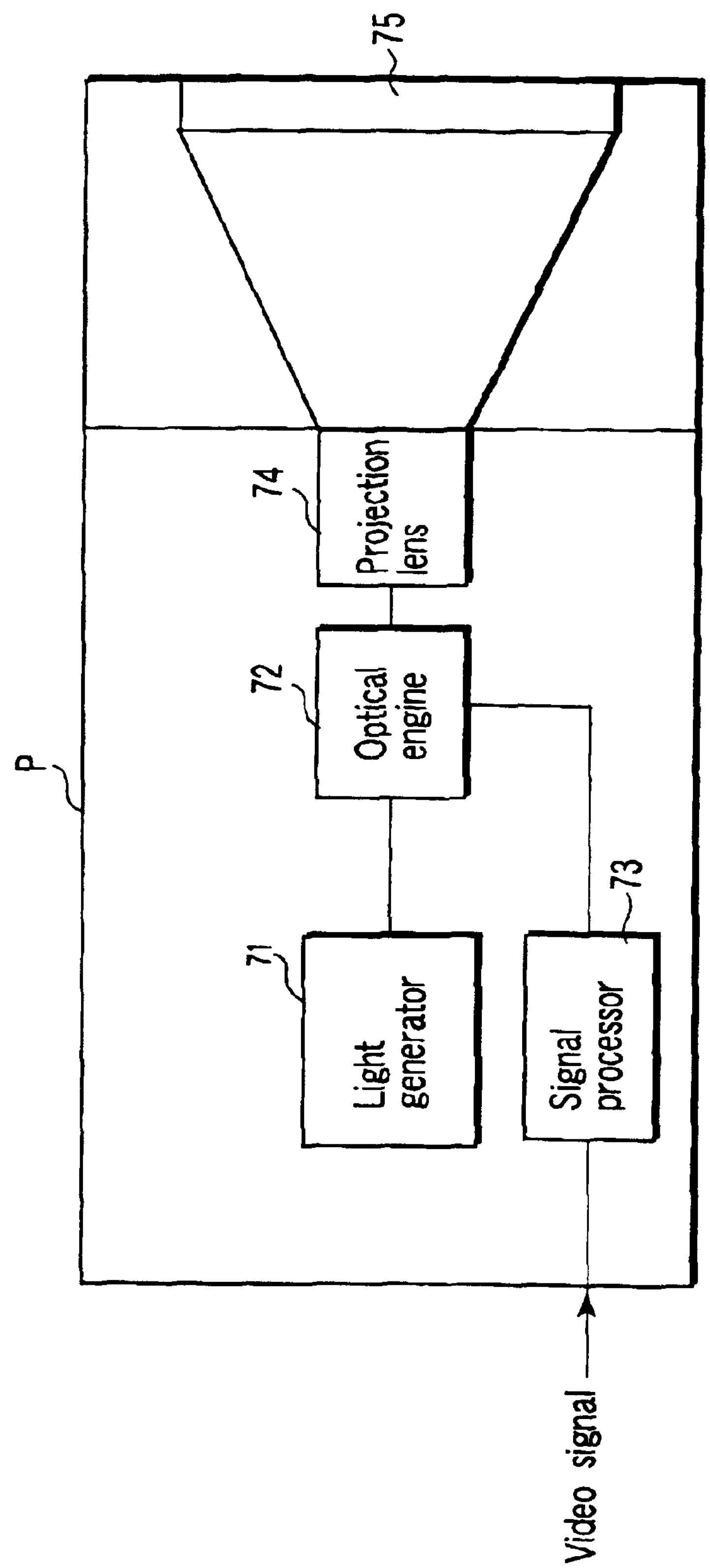
FIG. 8 is a block diagram showing an example of a projection television using a laser apparatus according an embodiment of the invention.

According to a third embodiment, there is provided a projection television having a laser apparatus embodying the present invention as a light source. FIG. 8 is a block diagram showing an example of a projection television employing a laser apparatus according to an embodiment of the invention.

The projection television P according to the third embodiment shown in FIG. 8 comprises at least a light source 71 having a structure according to the first or second embodiment, a signal processing unit 73 for processing an external video signal in a predetermined way and supplying a control signal to an optical engine 72, the optical engine 72 composed of a DMD or a liquid crystal irradiated with light from the light source 71 for generating an image light in accordance with the control signal, and a projection lens 74 for projecting the image light from the optical engine 72 to a display 75.

A laser apparatus according to an embodiment of the invention is for obtaining a uniform exit light beam and provides a high-quality reproduced image, for example, when used with the light source, etc. of the projection television according to the third embodiment.

With the various embodiments described above, those skilled in the art can realize the present invention. Nevertheless, it is easy for those skilled in the art to conceive various modifications of the aforementioned embodiments, and the invention is easily applicable by those skilled in the art to various embodiments without any inventive ability. The present invention, therefore, covers a wide range of applications without departing from the disclosed principle and the novel features, and is not confined to the embodiments described above.

As explained above, with the fiber connecting method and the laser apparatus using the same method according to an embodiment of the invention, a uniformly mixed exit light beam can be obtained from a single-core fiber without being affected by the position of each fiber forming a fiber bundle connected with a single-core fiber.

What is claimed is:

1. A method of connecting fiber comprising:

combining a plurality of fibers into a fiber bundle such that light beams enter the fibers at different angles of incidence so that light beams exiting out of outer fibers of the bundle assume a low order mode and light beams exiting out of an inner fiber of the bundle assumes a higher order mode than the low order mode of the outer fibers; and connecting each one end of said plurality of fibers to an end of a single-core fiber having a larger core diameter than the fibers, the fibers having different directions and characteristics at different positions connected with the single-core fiber.

2. A method of connecting fibers according to claim 1, wherein each of said plurality of fibers forming the fiber bundle is directed at an angle toward the center axis of the single-core fiber.

3. A method of connecting fibers according to claim 1, wherein each end of said plurality of fibers forming the fiber bundle, that is connected to the single-core fiber, has a cross section at an angle.

4. A method of connecting fibers according to claim 1, wherein said plurality of fibers forming the fiber bundle are three fibers for a red laser, a blue laser and a green laser, respectively.

5. A method of connecting fibers, comprising:

combining a plurality of fibers into a fiber bundle such that outer fibers of the bundle have a low numerical aperture and an inner fiber of the bundle has a higher numerical aperture than the low numerical aperture of the outer fibers; and connecting each one end of said plurality of fibers to an end of a single-core fiber having a larger core diameter than the fibers, the fibers having different directions and characteristics at different positions connected with the single-core fiber.

6. A method of connecting fibers according to claim 5, wherein each of said plurality of fibers forming the fiber bundle is directed at an angle toward the center axis of the single-core fiber.

7. A method of connecting fibers according to claim 5, wherein each end of said plurality of fibers forming the fiber bundle that is connected to the single-core fiber, has a cross section at an angle.

8. A method of connecting fibers according to claim 5, wherein said plurality of fibers forming the fiber bundle are three fibers for a red laser, a blue laser and a green laser, respectively.

9. A laser apparatus, comprising:

a plurality of laser generators; and a group of fibers including a plurality of fibers connected to each of the laser generators and a single-core fiber connected to a fiber bundle that includes said plurality of fibers, the single-core fiber having a larger core diameter than the fibers, wherein said plurality of fibers forming the fiber bundle are configured such that light beams enter the fibers at different angles of incidence so that light beams exiting out of outer fibers of the bundle assume a low order mode and light beams exiting out of an inner fiber of the bundle assumes a higher order mode than the low order mode of the outer fibers.

10. A laser apparatus according to claim 9, wherein each of said plurality of fibers forming the fiber bundle is directed at an angle toward the center axis of the single-core fiber.

11. A laser apparatus according to claim 9, wherein each of the ends of said plurality of fibers forming the fiber bundle, that are connected to the single-core fiber, has a cross section at an angle.

12. A laser apparatus according to claim 9, wherein said plurality of fibers forming the fiber bundle are three fibers irradiated with a red laser, a blue laser and a green laser, respectively, by the laser generators.

13. A laser apparatus, comprising:

a plurality of laser generators; and a group of fibers including a plurality of fibers connected to each of the laser generators and a single-core fiber connected to a fiber bundle that includes said plurality of fibers, the single-core fiber having a larger core diameter than the fibers, wherein said plurality of fibers forming the fiber bundle are configured such that outer fibers of the bundle have a low numerical aperture and an inner fiber of the bundle has a higher numerical aperture than the low numerical aperture of the outer fibers.

14. A laser apparatus according to claim 13, wherein each of said plurality of fibers forming the fiber bundle is directed at an angle toward the center axis of the single-core fiber.

15. A laser apparatus according to claim 13, wherein each of the ends of said plurality of fibers forming the fiber bundle that are connected to the single-core fiber, has a cross section at an angle.

16. A laser apparatus according to claim 13, wherein said plurality of fibers forming the fiber bundle are three fibers irradiated with a red laser, a blue laser and a green laser, respectively, by the laser generators.

17. A projection television, comprising:

a light source including a plurality of laser generators, a plurality of fibers connected to each of the laser generators, and a single-core fiber connected to a fiber bundle formed of said plurality of fibers, said single-core fiber having a larger core diameter than the fibers; and a display configured to display an image based on the video information supplied thereto, using light radiated from the light source, wherein said plurality of fibers forming the fiber bundle are configured such that light beams enter the fibers at different angles of incidence so that light beams exiting out of outer fibers of the bundle assume a low order mode and light beams exiting out of an inner fiber of the bundle assumes a higher order mode than the low order mode of the outer fibers.

18. A projection television according to claim 17, wherein each of said plurality of fibers forming the fiber bundle is directed at an angle toward the center axis of the single-core fiber.

19. A projection television according to claim 17, wherein each end of said plurality of fibers forming the fiber bundle that is connected to the single-core fiber, has a cross section at an angle.

20. A projection television according to claim 17, wherein said plurality of fibers forming the fiber bundle are three fibers for a red laser, a blue laser and a green laser, respectively.

21. A projection television, comprising:

a light source including a plurality of laser generators, a plurality of fibers connected to each of the laser generators, and a single-core fiber connected to a fiber bundle formed of said plurality of fibers, said single-core fiber having a larger core diameter than the fibers; and a display configured to display an image based on the video information supplied thereto, using light radiated from the light source, wherein said plurality of fibers forming the fiber bundle are configured such that outer fibers of the bundle have a low numerical aperture and an inner fiber of the bundle has a higher numerical aperture than the low numerical aperture of the outer fibers.

22. A projection television according to claim 21, wherein each of said plurality of fibers forming the fiber bundle is directed at an angle toward the center axis of the single-core fiber.

23. A projection television according to claim 21, wherein each end of said plurality of fibers forming the fiber bundle that is connected to the single-core fiber, has a cross section at an angle.

24. A projection television according to claim 21, wherein said plurality of fibers forming the fiber bundle are three fibers for a red laser, a blue laser and a green laser, respectively.

* * * * *